United States Patent
Richter et al.

(10) Patent No.: US 12,401,255 B2
(45) Date of Patent: Aug. 26, 2025

(54) SENSOR DEVICE FOR CONTACTLESS DETERMINATION OF A RADIAL POSITION OF A ROTOR

(71) Applicant: Adaptive Balancing Power GmbH, Munich (DE)

(72) Inventors: Michael Richter, Darmstadt (DE); Hendrik Schaede-Bodenschatz, Darmstadt (DE)

(73) Assignee: ADAPTIVE BALANCING POWER GMBH, Munich (DE)

( * ) Notice: Subject to any disclaimer, the term of this patent is extended or adjusted under 35 U.S.C. 154(b) by 230 days.

(21) Appl. No.: 18/327,247

(22) Filed: Jun. 1, 2023

(65) Prior Publication Data
US 2023/0396131 A1    Dec. 7, 2023

(30) Foreign Application Priority Data
Jun. 3, 2022   (DE) .............. 2022 205 695.7

(51) Int. Cl.
*H02K 11/225* (2016.01)
*H02K 7/02* (2006.01)

(52) U.S. Cl.
CPC ........... *H02K 11/225* (2016.01); *H02K 7/025* (2013.01)

(58) Field of Classification Search
CPC .. H02K 11/225; H02K 7/025; G01D 5/24438; G01D 5/202; G01B 7/003; G01B 7/02
USPC ............................ 310/66, 74, 153
See application file for complete search history.

(56) References Cited

U.S. PATENT DOCUMENTS

| | | | | |
|---|---|---|---|---|
| 6,566,775 B1 * | 5/2003 | Fradella | .................. | H02K 7/02 |
| | | | | 310/90.5 |
| 11,692,852 B2 * | 7/2023 | Biggs | .................. | G01D 5/2053 |
| | | | | 324/207.17 |
| 2002/0196015 A1 * | 12/2002 | Zapf | .................. | G01D 5/2291 |
| | | | | 324/207.17 |
| 2006/0233123 A1 * | 10/2006 | Lee | ................ | G01D 5/202 |
| | | | | 370/295 |
| 2008/0007251 A1 * | 1/2008 | Lee | .................. | B62D 15/0215 |
| | | | | 324/207.17 |
| 2011/0109304 A1 * | 5/2011 | Suzuki | ................ | H02K 24/00 |
| | | | | 324/207.25 |
| 2013/0021023 A1 * | 1/2013 | Niwa | .................. | G01D 5/202 |
| | | | | 324/207.15 |
| 2014/0132253 A1 * | 5/2014 | Bertin | ................ | G01D 5/2053 |
| | | | | 324/207.17 |

(Continued)

*Primary Examiner* — Ahmed Elnakib
(74) *Attorney, Agent, or Firm* — Michael J. Feigin, Esq.; Feigin and Fridman LLC

(57) ABSTRACT

A sensor device for contactless determination of a radial position of a rotor has a target unit on the rotor with an electrically conductive target material. A coil unit is adapted for electromagnetic interaction with the target material. A control unit is electrically coupled to the coil unit and is designed to excite a coil of the coil unit with an excitation signal and to detect and evaluate a response signal of the coil unit in to determine the radial position of the rotor. The target unit has target elements with the target material in the direction of rotation on the rotor separated by a gap and the gaps of the target unit. Coil(s) of the coil unit are matched to each other in their geometry in such a way that the temporal change of the portion of the coil projected onto the target unit in a radial projection.

10 Claims, 2 Drawing Sheets

(56) References Cited

U.S. PATENT DOCUMENTS

| | | | |
|---|---|---|---|
| 2015/0323348 A1* | 11/2015 | Liu | G01P 3/487 |
| | | | 324/207.17 |
| 2017/0292857 A1* | 10/2017 | Leidich | G01R 27/2611 |
| 2019/0072414 A1* | 3/2019 | Utermoehlen | G01D 5/208 |
| 2021/0328483 A1* | 10/2021 | Ausserlechner | G01D 5/2066 |
| 2022/0113167 A1* | 4/2022 | Zhou | G01D 5/202 |
| 2023/0037760 A1* | 2/2023 | Lerchenmueller | G01B 7/30 |
| 2023/0089358 A1* | 3/2023 | Chen | G01L 5/221 |
| | | | 310/68 B |
| 2023/0314120 A1* | 10/2023 | Shaga | G01D 5/20 |
| | | | 324/207.16 |
| 2023/0314180 A1* | 10/2023 | Shaga | G01D 5/2053 |
| | | | 324/207.15 |
| 2023/0396131 A1* | 12/2023 | Richter | H02K 7/025 |

* cited by examiner

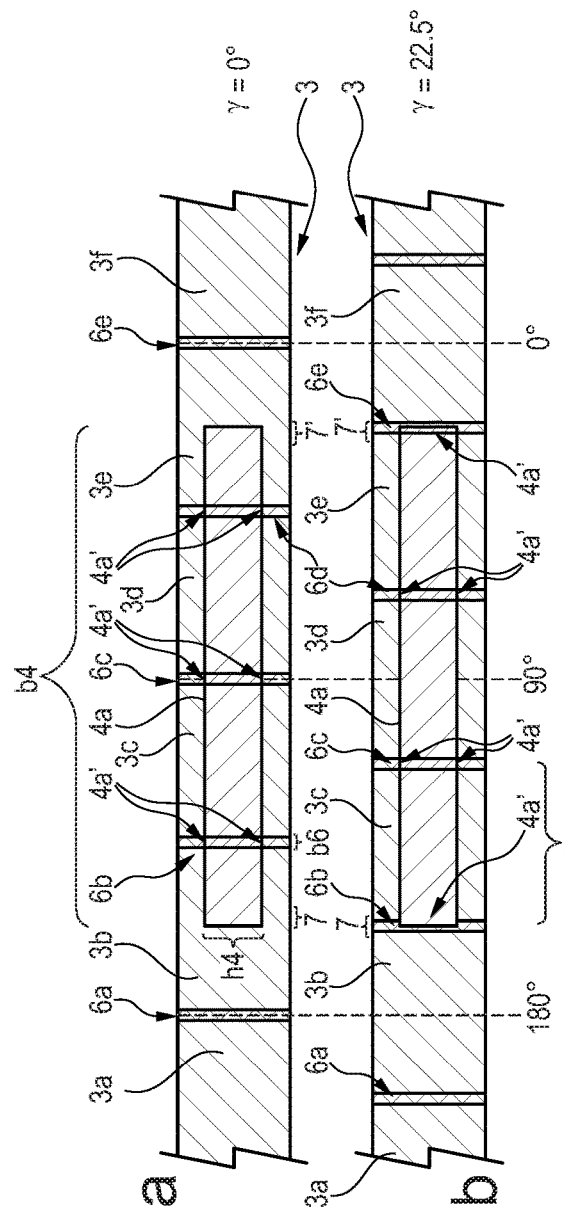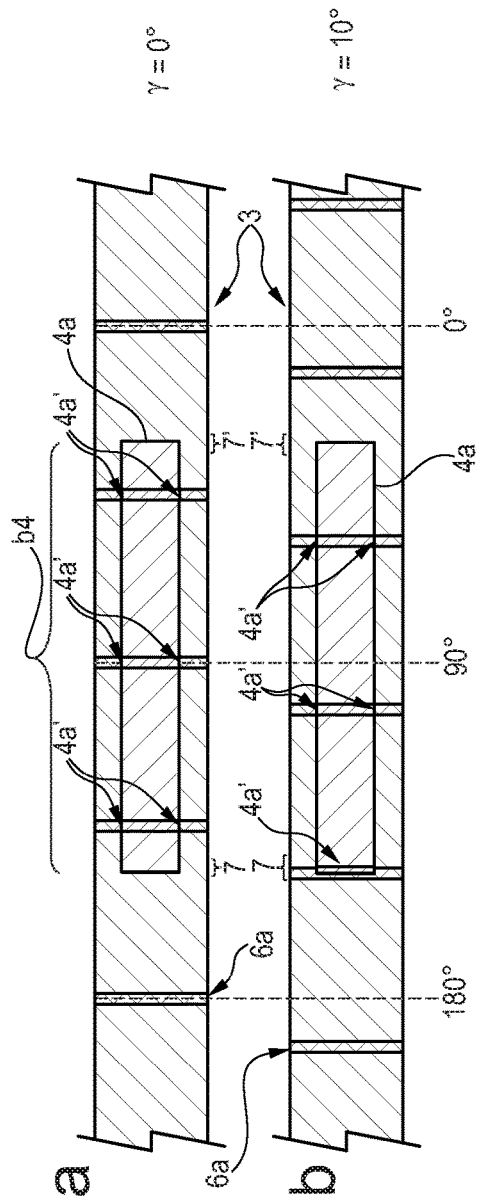

SENSOR DEVICE FOR CONTACTLESS DETERMINATION OF A RADIAL POSITION OF A ROTOR

FIELD OF THE INVENTION

The present disclosure relates to a sensor device for contactless determination of a radial position of a rotor which is adapted to rotate about a longitudinal axis, comprising a target unit arranged on the rotor and comprising an electrically conductive target material, a coil unit comprising at least one coil and adapted for electromagnetic interaction with the target material of the target unit, and a control unit electrically coupled to the coil unit and adapted to control the coil unit, which has at least one coil and is designed for electromagnetic interaction with the target material of the target unit, and with a control unit which is electrically coupled to the coil unit and is designed to excite the coil of the coil unit with an excitation signal and to detect and evaluate a response signal of the coil unit in order to determine the radial position of the rotor.

BACKGROUND

In systems with active magnetic bearings, electromagnetic sensor devices such as eddy current sensors or inductive sensors are frequently used for contactless determination of a distance in the bearing. Such sensor devices can also be referred to as electromagnetic sensor devices or inductive sensor devices. The quality of the measurement or response signal evaluated in the electromagnetic sensor device depends to a large extent on the quality of the sensor target, the target unit. Defects of the sensor target, for example due to superficial damage to a target element with the target material, lead to a falsification of the measured distance and thus to a falsified position determination of the shaft in the bearing of the magnetic bearing system. This is of particular importance in the case of large differential speeds between the sensor target and the sensor head provided with the coil, since the falsifications introduce dynamic excitations into a closed control loop, which have negative effects for the actively magnetically supported and thus controlled system. They lead to an unnecessarily high actuating activity of the active magnetic bearing of the controlled system.

In practice, various methods are used to remove interference from the response signal to be evaluated, for example via low-pass filters and/or via special algorithms such as so-called track compensation. However, these methods also entail a number of disadvantages for the controlled system, so that significantly better performance is achieved in an active magnetic bearing if these disturbances can be minimized by themselves. An alternative to electronic post-processing or filtering of the response signal is the use of planar sensor heads, which scan a larger area of the sensor target and are thus less affected in their response signal by defects in the sensor target.

EP 3 517 896 B1 describes such a flat sensor head for external/outer rotor rotors. The aim is to make maximum use of the available cylindrical target area, combined with a high resolution of the position determination, a high sensitivity. The high resolution of the position determination is achieved by using the complete circumference of the rotor as a target unit, whereby the sensitivity of the sensor head varies sinusoidally in the circumferential or orbital direction, i.e. in the tangential direction. This forms an axis, i.e. a preference direction of the sensor head.

SUMMARY OF THE INVENTION

Accordingly, the present invention is based on the task of providing a sensor device for the contactless determination of a radial position of a rotor, which has an improved error tolerance and thus enables, in particular, a more precise control of an active magnetic bearing.

This task is solved by the subject-matter of the independent patent claim. Advantageous embodiments result from the dependent patent claims, the description and the figures.

One aspect relates to a sensor device (also referred to as an electromagnetic sensor device) for contactless determination of a radial position of a rotor which is designed for rotation about a longitudinal axis. Preferably, the rotor is designed for intended use with circumferential speeds of more than 50 m/s, particularly preferably more than 150 m/s, since particularly large centripetal forces occur there, which makes it advantageous to provide the target unit described below with a plurality of target elements as described there. Accordingly, the positive effects achieved by the sensor device presented are particularly relevant there. For example, the rotor may be the rotor of a flywheel mass storage device for storing energy, in particular an external/outer rotor. The radius of the rotor can be, for example, greater than 30 mm, in particular greater than 100 mm.

The sensor device has a target unit, a coil unit, and a control unit. The target unit is arranged on the rotor and has an electrically conductive target material. The coil unit has at least one (i.e., one or more), typically multiple coils, for example, four coils. The coils may each have multiple windings. The coil unit is configured for electromagnetic interaction with the target material of the target unit. Accordingly, at least a respective major part of the respective coil is arranged no further than a predetermined maximum distance from the target unit. The maximum distance is suitably selected to ensure the electromagnetic (in particular inductive) interaction between coil and target material required for the intended use. The control unit is electrically coupled to the coil unit and is designed to excite the coil unit with an excitation signal, in particular a sinusoidal excitation signal of a predetermined frequency, and to detect and evaluate a response signal from the coil unit in order to determine the radial position of the rotor. The response signal usually contains a sinusoidal component in which any amplitude modulations are measured. As is known, this can be done, for example, in the manner of a Wheatstone's measuring bridge.

The target unit comprises, in the direction of rotation on the rotor, i.e. in the tangential direction of the rotor, several target elements with the target material which are separated from each other in the direction of rotation by a respective gap. The gaps of the target unit and the at least one coil of the coil unit are thereby matched to each other in their geometry, in particular the orientation of the gaps as well as the orientation and the shape of the coil(s) or the course of the coil, in such a way that the temporal change of the portion of the coil which is projected onto the gaps of the target unit in a radial projection onto the target unit when the rotor is rotating is substantially zero while the target unit is moving past the coil unit. In this case, the projected portion of the coil is spaced no further than a predetermined maximum distance from the target elements, so only that portion of the coil which is close enough to the target elements to interact with the target unit to any significant degree during intended use, i.e., as the target unit moves past the coil unit, is projected. The distance between the coil and the target unit is measured in a radial direction. The projected portion of the coil is thereby preferably a major part of the coil, i.e. at least 75% of the coil, preferably at least 85% of the coil, particularly preferably at least 95% of the coil. The gaps are preferably straight/rectilinear, particularly preferably axially oriented, i.e. oriented parallel to the longitudinal axis of the rotor. This brings advantages in terms of production technology and nevertheless permits the described advantageous geometrical adaptation of coil and gaps to each other.

The sensor device described here is thus based on the insight that gaps in target units with several target elements separated from each other by gaps, i.e. segmented sensor targets, contribute significantly to a deterioration of the response signal of the coil unit, and that this deterioration is decisively improved by geometrically matching the geometry of the coils used to the geometry of the gaps and/or the geometry of the gaps to the geometry of the coils. Thus, the geometry of the coil, and thus the sensor winding, and the geometry of the gaps, and thus the segmented sensor target, are matched to each other in such a way that when the segmented sensor target is moved across the sensor head or sensor winding, there is minimal disturbance to the sensor or response signal. As a result, when used, for example, for an active magnetic bearing, only minimal disturbance is introduced into the closed loop control of the system, for example, the magnetic bearing. Accordingly, fault tolerance is improved and performance in the magnetic bearing system, for example in a flywheel mass storage system, is enhanced. Especially external rotor rotors of systems rotating at high speed, such as magnetic bearing-mounted external rotor flywheel mass storage systems, often have tangentially segmented sensor targets: There, the centripetal forces that occur are generally so large that the radius of the rotor is speed-dependent and thus the size of a contiguous target area of the target unit is limited. However, since a large target area is desired for accurate and fault-tolerant position determination, a segmented sensor target is required. Due to the resulting gaps in the target area of the target unit, which typically run axially, the individual target segments or target elements enter and leave the measuring area of the coil unit one after the other during operation. This results in repetitive disturbances of the sensor signal occurring at a multiple of the rotational speed. The speed-dependent radius of the rotor leads to a speed-dependent gap geometry, and in particular the gap width can change as a function of speed. For example, a gap width that is only 0 mm at low speeds can increase to as much as 3 mm. Accordingly, it is difficult to estimate and electronically compensate for disturbances in a given operating mode, so preventing the occurrence of disturbances is particularly desirable.

Said disturbances occur when there is a change in the coil length covered (in the radial projection onto the target unit) by the sensor target, the target elements, i.e. when one or more sections of the coil are located above the gap between two target elements, i.e. in the gap in the radial projection. The larger the portion of the coil that is not covered by the target element, the greater the interference. Therefore, in the present case, the aim is to achieve the smallest possible change in the length of the sensor coil that is not covered by the sensor target when the sensor target is moved. This is achieved by the described feature of the substantially zero temporal change of the portion of the coil that is projected onto the target unit in a radial projection onto the gap of the target unit when the rotor is rotating. This applies only to the portion of the coil which is spaced no farther than the predetermined maximum distance from the target elements. In particular, values of less than 15% for the portion of the respective coil projected onto the gap in the radial projection, preferably less than 10%, more preferably less than 5%, and most preferably less than 1%, can be understood as substantially zero. For example, the temporal change of the portion of the coil projected, in the radial projection, onto the gap when the rotor is rotating can be determined by determining, for each instant of time, i.e. for each angle of rotation of the rotor, which portion of the coil is projected onto the gap, which provides a corresponding (percentage) portion value for each instant of time. The difference between the largest and smallest portion values is then essentially zero, i.e. in particular less than 15%, preferably less than 10%, particularly preferably less than 5% and most preferably less than 1%. For example, at one or more first rotation angles, the portion of the coil which is projected onto the gaps may be a smallest portion value of 2% and at one or more second rotation angles, the portion of the coil which is projected onto the gaps may be a largest portion value of 10%. In this case, the change over time of the portion of the coil that is projected onto the gaps of the target unit when the rotor is rotating in a radial projection onto the target unit can be considered to be substantially zero, namely having the exemplary value of 8%.

The respective coil can therefore, as also described further below, have a substantially constant distance from the target elements overall, i.e. run uniformly over the entire length of the coil on a predetermined radius around the longitudinal axis, or run only partially on the predetermined radius and, for example, run radially and axially in the coil reversal regions explained below, i.e. be arranged at a greater than the predetermined maximum distance from the target elements. This is based on the knowledge that only the part of the coil which does not exceed the predetermined maximum distance from the target elements, i.e. is close enough for the electromagnetic interaction, can cause significant interference in the response signal.

Overall, this results in an improved sensor device for contactless determination of a radial position of a rotor, in which the described suitable selection of the geometry of coil and gaps means that disturbances in the response signal of the coil unit do not have to be compensated, since they are stopped in their formation. Accordingly, the sensor device becomes more fault-tolerant overall and can be used for improved control of an active magnetic bearing, for example.

In an advantageous embodiment, it is provided that the coil forms a non-zero axial angle with the gaps in a coil reversal region, preferably in two coil reversal regions, in which a predetermined direction of rotation of the coil along the coil reverses its tangential direction, at least in a substantial section of the coil. The axial angle may be at least 15°, preferably at least 35°, particularly preferably at least 60°. The axial angle is preferably measured in the radial projection, for example on an unrolled circumferential surface of the rotor. The non-zero axial angle between the coil and the gaps prevents the gaps and the coil from being parallel, and thus greatly reduces the portion of the coil in the reversal region which is projected onto a gap in the radial position. For example, the substantial section of the coil in the coil reversal region comprises at least 75% of the coil in the coil reversal region, preferably at least 85%, more preferably at least 95%. In particular, the substantial section may also comprise a central section of the coil, i.e., a section comprising the center of the coil in the coil reversal region.

The coil reversal region may also be specified as a region in which the coil extends transversely (not parallel) or substantially transversely (intersecting at a small angle of, for example, less than 10°, less than 5°, or less than 3°) to a plane specified with the longitudinal axis of the rotor as a normal vector (at least substantially transverse to a tangentially extending direction of rotation of the rotor)

In an advantageous embodiment, it may be provided that at least one gap and/or the coil in the reversal region or regions is or are round or elliptical in shape. Alternatively or supplementarily, it can be provided that at least one gap and/or the coil of the coil reversal region or regions is/are in each case at least sectionally, i.e. sectionally or completely, straight/rectilinearly shaped. Particularly advantageous here is a combination of a rectilinear gap, which runs axially (parallel to the longitudinal axis), with either a coil adapted in its geometry, which is round or elliptically shaped in the reversal region, or a coil adapted in its orientation, which is rectilinearly shaped in the reversal region at least in sections, in particular in the central section, but does not run parallel to the gap. The latter embodiment is particularly advantageous because it is especially easy to implement in terms of production technology.

In a further advantageous embodiment, it is provided that, with the rotor centered, a radial distance of the coil from the target elements in at least one coil reversal region is greater than in a central region of the coil between two reversal regions, in which the coil runs in the tangential direction with the predetermined radius about the longitudinal axis. In particular, the radial distance of the coil in the coil reversal region may be at least twice as large as in the central region. Preferably, the radial distance in the central region is not greater than the maximum distance and in the coil reversal region is greater than the maximum distance. As explained above, this has the advantage that the coil reversal region, which is the cause of the disturbances, practically does not "see" the target elements and thus also the gaps, since the interaction between coil and target element is reduced to essentially zero by the increased distance.

In a further advantageous embodiment, it is provided that a tangential length of the coil is dimensioned in such a way that, of two coil reversal regions in which the coil runs in particular parallel to the gaps, only the coil in at most one coil reversal region is projected onto a gap in the radial projection, irrespective of a rotational position of the rotor relative to the coil. Thus, for regularly spaced gaps, in the radial projection, the tangential length of the coil is not an integer multiple of a tangential spacing of the gaps. This has the advantage of avoiding that two coil reversal regions rotate past one gap at the same time, which reduces disturbances occurring in the response signal due to the nonlinearity of the system by more than 50%, with a 50% reduction in the temporal change of the portion of the coil that is projected onto the gaps of the target unit in the radial projection when the rotor is rotating.

In another advantageous embodiment, it is provided that the ratio of tangential length of the coil to an axial width of the coil does not fall below a value of 5:1. The axial width may be at least 1 mm and/or at most 10 mm. Preferably, the axial width of the coil is at least twice the target distance, i.e. twice the width of the radial distance between the coil and the target element at the intended central position of the rotor relative to the coil unit. This also ensures that the coil reversal area can remain small, thereby reducing the magnitude of interference.

A further aspect relates to an active magnetic bearing having a sensor device according to one of the described embodiments and a control unit coupled to the sensor device, which controls the magnetic bearing as a function of a sensor signal received from the sensor device. Another aspect relates to a flywheel mass storage device for storing energy, with a sensor device according to one of the described embodiments, wherein a flywheel mass of the flywheel mass storage device forms the rotor of the sensor device designed as an external rotor.

The features and combinations of features mentioned above in the description, also in the introductory part, as well as the features and combinations of features mentioned below in the description of the figures and/or shown alone in the figures are usable not only in the respective combination indicated, but also in other combinations without leaving the scope of the invention. Thus, embodiments are also to be regarded as encompassed and disclosed by the invention which are not explicitly shown and explained in the figures, but which arise from the explained embodiments and can be generated by separate combinations of features. Embodiments and combinations of features are also to be regarded as disclosed which thus do not have all the features of an originally formulated independent claim. Furthermore, embodiments and combinations of features are to be regarded as disclosed, in particular by the embodiments set forth above, which go beyond or deviate from the combinations of features set forth in the recitations of the claims.

BRIEF DESCRIPTION OF THE FIGURES

With the aid of the schematic drawings shown in the following figures, the object according to the invention will be explained in more detail, without wishing to limit it to the specific embodiments shown here. Thereby:

FIG. 6 shows a geometry of gaps and coil known from the prior art in a radial projection;

and FIG. shows 7 a final example of a geometry of gaps and coil in the radial projection of FIG. 6.

In the different figures, the same or functionally identical elements are provided with the same reference signs.

DETAILED DESCRIPTION OF EMBODIMENTS OF THE INVENTION

Figure 1:
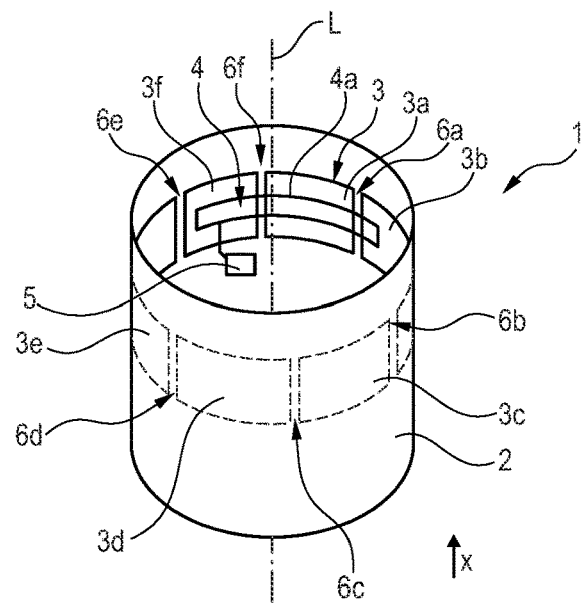
FIG. 1 shows a schematic view of an exemplary sensor device for contactless determination of a radial position of a rotor.

FIG. 1 shows a schematic representation of a sensor device 1 for contactless determination of a radial position of a rotor 2, which is designed to rotate about a longitudinal axis L, with a target unit 3, a coil unit 4 and a control unit 5.

The target unit 3 is arranged on the rotor 2, which is an external rotor in the present case, and comprises an electrically conductive target material. The coil unit has at least one coil 4a, here exactly one coil 4a, and is designed for electromagnetic interaction with the target material of the target unit 3. The control unit 5 is electrically coupled to the coil 4a in coil unit 4 and is designed to excite the coil unit 4 with an excitation signal and to detect and evaluate a response signal from the coil unit 4 in order to determine the radial position of the rotor 2 relative to the coil unit 4 and thus, for example, relative to the stator or bearing shell. The target unit 3 thereby has, in the direction of rotation on the rotor 2, i.e. tangentially, a plurality of target elements 3a to 3f with the target material, which are separated from one another by respective gaps 6a to 6f. In this case, the gaps 6a to 6f of the target unit 3 and the at least one coil 4a of the coil unit 4 are matched to one another in their geometry in such a way that the temporal change of the portion of the at least one coil 4a which is projected onto the gaps 6a to 6f of the target unit 3 in a radial projection onto the target unit 3 when the rotor 2 is rotating is essentially zero, the projected portion of the coil 4a being spaced no further than a predetermined distance, a maximum distance, from the target elements.

Figure 2:
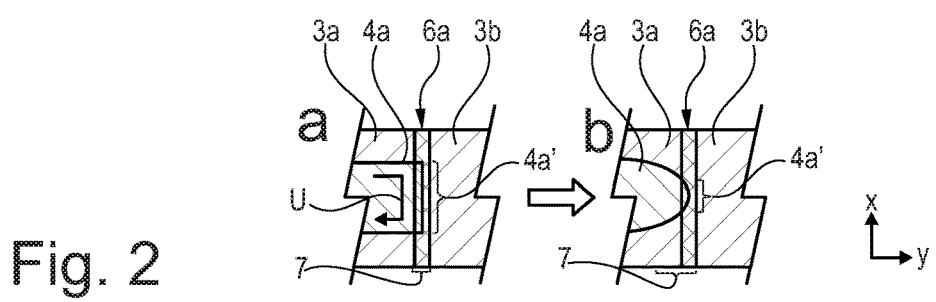
FIG. 2 shows an exemplary adapted geometry of gap and coil in a radial projection.

FIG. 2, partial image a, shows a section of a radial projection onto the target unit 3 with a geometry of gap 6a and coil 4a known from the prior art. Also the further figures show such radial projections in an analogous manner, without this being explained separately. In the coil reversal region 7, in which a circulation direction U given along the coil 4a reverses its tangential direction, i.e. in the present case reverses from positive y-direction to negative y-direction, here the portion 4a' of the coil, which is projected onto the gap 6a in the radial projection shown, runs parallel to this gap 6a and accordingly takes up a large portion of the entire coil 4a. Since the gap moves in the y-direction relative to the coil 4a when used as intended, the temporal change of the portion 4a' of the coil projected onto the gap 6a of the target unit 3 in the radial projection onto the target unit when the rotor is rotating is characterized by large fluctuations.

Accordingly, in partial image 2b an exemplary improved geometry is shown, according to which, with unchanged gap geometry, the coil 4 is elliptically shaped in the coil reversal region 7. Accordingly, the proportion 4a' of the total coil length 4a is substantially smaller at the time shown and also at the other times, and the magnitude of the disturbances resulting from the proportion 4a' is reduced substantially to zero in operation, i.e. when the target unit 3 is rotating.

Figure 3:
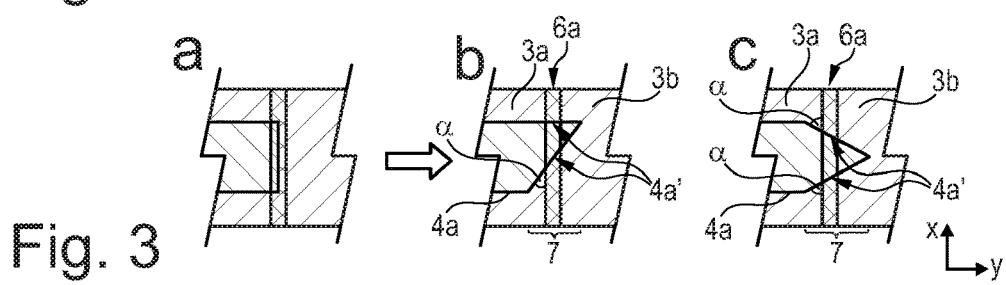
FIG. 3 shows a second and a third exemplary geometry of gap and coil in the radial projection.

FIG. 3 first shows, in partial image a, the geometry known from FIG. 2a. Partial images 3b and 3c then show two exemplary geometries for the coil 4, in which the gap 6a runs in an axially oriented straight lines, as is also known from the prior art, and the coil 4a also runs in a straight line in the reversal region 7 in sections, in this case completely in partial image 3b and in two sections in partial image 3c, and is thus straight except for the tip of the two converging straight line sections. Thereby, an axial angle α is formed between the first of the two rectilinear sections 4a' in the coil reversal region 7 between gap 6a and coil 4a in the projection, and an axial angle α' is formed between the second of the two rectilinear sections 4a' in the coil reversal region 7 between gap 6a and coil 4a in the projection, respectively. The angles α, a' may or may not be equal. Also in this way, the portion 4a' of the coil projected onto the gap 6a of the target unit 3 at the time shown is kept small, and thus the change over time of the portion of the coil 4 projected onto the gap 6a of the target unit 3 in a radial projection when the rotor 2 is rotating is minimized to substantially zero.

Figure 4:
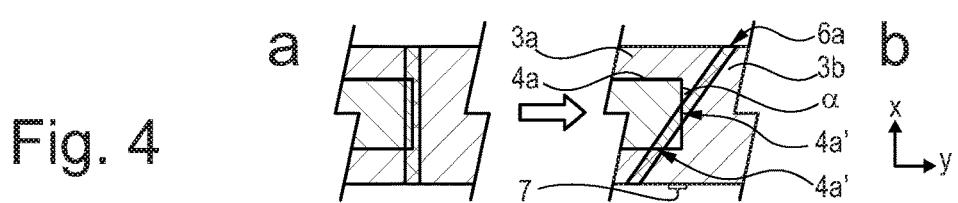
FIG. 4 shows a fourth exemplary geometry of gap and coil in the radial projection.

In FIG. 4, partial image a again shows the geometry of FIG. 2a. In partial image FIG. 4b, the conventional, for example rectangular, course of the coil 4a is now shown with a section 4a' running completely axially in the reversal area 7. This coil 4a is combined with a rectilinear gap 6a, the orientation of which, however, has been adapted to the conventional geometry of the coil 4a by changing the axial inclination, i.e. the gap is tilted (non-parallel) with respect to the section 4a'. Analogous to the geometry shown in FIGS. 3b and 3c, the interference-causing section 4a' is thus also reduced to essentially zero here.

Figure 5:
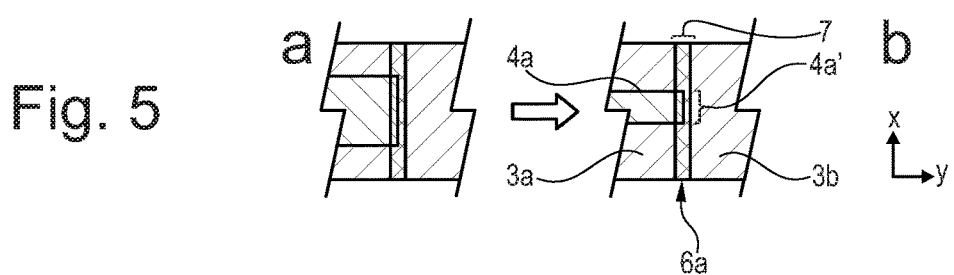
FIG. 5 shows a fifth exemplary geometry of the gap and coil in a radial projection.

FIG. 5 now again shows in partial image 5a the geometry of the prior art known from FIG. 2a. In partial image 5b, the ratio of the tangential length of the coil 4a, i.e., the length of the coil 4a in the y-direction, to an axial width of the coil, i.e., the width of the coil in the x-direction, is a value of less than 5:1, so that the component 4a' in the reversal region 7 is reduced with comparable behavior, in particular with comparable amplitude of the response signal of the coil 4 relative to a strength of the excitation signal. Here, too, interference is reduced accordingly by reducing the interference-causing component 4a' to essentially zero.

In FIG. 6, the projection of the coil 4a onto the target unit 3 is shown in the partial images 6a and 6b for two different rotation angles γ of the target unit 3 relative to the coil 4a and thus the coil unit 4. The geometry of the coil 4a and the gaps 6a to 6e are thereby predetermined as known from the prior art, in this case extending rectilinearly in the axial direction. Thereby, the rotation angle γ for the partial image 6a is arbitrarily set to 0° in a correspondingly selected stationary reference system, whereas in the partial image 6b a rotation of target unit 3 with respect to coil unit 4 by 22.5° has taken place.

In partial image 6a, the coil 4 is not projected onto one of the gaps 6a to 6e in either of the two reversal regions 7, 7'. Accordingly, the portion 4a' of the coil 4a which is projected onto one of the gaps 6a to 6e in the projection is vanishingly small.

The situation is different in the example shown in partial image 6b, in which the target unit 3 is rotated further. Since the tangential length b4 of the coil 4a (in the radial projection) is a multiple of the tangential distance of the gaps 6a to 6e, which is given as the sum of the tangential width b3 of the target elements 3a to 3f and the tangential width b6 of the gaps 6a to 6e due to the dynamics of the system, the coil 4a is projected simultaneously onto a gap 6b, 6e in both reversal regions 7, 7' at the shown rotation angle γ of 22.5°. As a result, the temporal change of the portion 4a' of the coil 4 projected onto the gaps 6a to 6e of the target unit 3 when the rotor 2 is rotating in a radial projection onto the target unit 3 varies greatly, resulting in large disturbances.

In FIG. 7, analogous to FIG. 6, the projection of the coil 4a onto the target unit 3 is now shown for two different rotation angles γ. In partial image 7a, the situation here is similar to partial image 6a and the portion 4a' of the coil 4a, which is projected onto the gaps 6a in the radial projection, is unchanged compared to the prior art. However, since the tangential length b4 of the coil 4a is not a multiple of the tangential distance (=tangential width b3+tangential width b6) of the gaps 6a to 6e, when the rotor 2 continues to rotate, the coil 4a is always located only in at most one reversal region 7 in the projection on one of the gaps 6a to 6e. The response signal of the coil or excitation behavior of the coil can thereby be maintained, for example, by adjusting, in this case increasing, the axial height h4 of the coil 4a. Alternatively to the shown decreasing of the tangential width b4 of the coil 4a, an increasing of the tangential width can analogously prevent the coil 4a from being projected in the radial projection in two reversal regions 7, 7' simultaneously onto gaps 6a to 6e. In both cases, the temporal change of the portion 4a' of the coil projected onto the target unit 3 in the radial projection onto the gaps 6a to 6e of the target unit when the rotor 2 is rotating is minimized, i.e. substantially zero.

The invention claimed is:

1. A flywheel mass accumulator for storing energy, where a flywheel mass of the flywheel mass accumulator forms a rotor designed as an outer rotor, with a sensor device for contactless determination of a radial position of the rotor which is adapted to rotate about a longitudinal axis (L), comprising
   a target unit which is arranged on the rotor and comprises an electrically conductive target material;
   a coil unit which comprises at least one coil and is adapted for electromagnetic interaction with the target material of the target unit
   a control unit which is electrically coupled to the coil unit and is designed to excite the coil of the coil unit with an excitation signal and to detect and evaluate a response signal of the coil unit in order to determine the radial position of the rotor;
characterized in that
   the target unit has, in the direction of rotation on the rotor, a plurality of target elements with the target material, which are separated from one another by a respective gap; and
   the gaps of the target unit and the at least one coil of the coil unit are matched to each other in their geometry in such a way that the temporal change of the portion of the coil, which is radially placed in front of the gaps of the target unit when the rotor is rotating is substantially zero, wherein the radially placed portion of the coil is spaced no further than a predetermined distance from the target elements.

2. The sensor device of claim 1, characterized in that the coil forms a non-zero axial angle with the gaps at least in sections in at least one coil reversal region, in which a circulation direction (U) predetermined along the coil reverses its tangential direction.

3. The flywheel mass accumulator of claim 2, characterized in that at least one gap and/or the coil of at least one coil reversal region is round or elliptically shaped.

4. The flywheel mass accumulator of claim 3, characterized in that at least one gap and/or the coil of at least one coil reversal region is in each case shaped rectilinearly at least in sections.

5. The flywheel mass accumulator of claim 4, characterized in that the axial angle is at least 15°.

6. The flywheel mass accumulator of claim 1, characterized in that a tangential length of the coil is dimensioned in such a way that of two coil-reversal regions, in which the coil runs in particular parallel to the gaps, irrespective of a rotational position of the rotor relative to the coil, only in at most one call reversal region the coil is radially placed in front of a gap.

7. The flywheel mass accumulator of claim 6, characterized in that the ratio of tangential length of the coil to an axial width of the coil does not fall below a value of 5:1.

8. The flywheel mass accumulator of claim 1, characterized in that the temporal change of the portion of the coil radially placed in front of the gaps of the target unit when the rotor is rotating is less than 10%.

9. A sensor device for contactless determination of a radial position, of a rotor which is adapted to rotate about a longitudinal axis (L), comprising
   a target unit is arranged on the rotor and comprises an electrically conductive target material;
   a coil unit which comprises at least one coil and is adapted for electromagnetic interaction with the target material pf the target unit
   a control unit which is electrically coupled to the coil unit and is designed to excite the coil of the coil unit with an excitation signal and to detect and evaluate a response signa; of the coil unit in order to determine the radial position of the rotor;
characterized in that
   the target unit has, in the direction of rotation on the rotor, a plurality of target elements with the target material, which are separated from one another by a respective gap; and
   the gaps of the target unit and the at least one coil of the coil unit are matched to each other in their geometry in such a way that the temporal change of the portion of the coil, which is radially placed in front of the gaps of the target unit when the rotor is rotating is substantially zero, wherein the radially placed portion of the coil is spaced no further than a predetermined distance from the target elements;
wherein:
   the coil forms a non-zero axial angle with the gaps at least in sections in at least one coil reversal region, in which a circulation direction (U) predetermines along the coil reverses its tangential direction; and the axial angle is at least 15°.

10. A sensor device for contactless determination of a radial position of a rotor which is adapted to rotate about a longitudinal axis (L), comprising
   a target unit which is arranged on the rotor and comprises an electrically conductive target material;
   a coil unit which comprises at least one coil and is adapted for electromagnetic interaction with the target material of the target unit
   a control unit which is electrically coupled to the coil unit and is designed to excite the coil of the coil unit with an excitation signal and to detect and evaluate a response signal of the coil unit in order to determine the radial position of the rotor;
characterized in that:
   the target unit has, in the direction of rotation on the motor, a plurality of target elements with the target material, which are separated from one another by a respective gap; and
   the gaps of the target unit and the at least one coil of the coil unit are matched to each other in their geometry in such a way that the temporal change of the portion of the coil, which is radially placed in front of the gaps of the target unit when the rotor is rotating is substantially zero, wherein the radially placed portion of the coil is spaced no further than a predetermined distance from the target elements;
   wherein a radial distance of the coil from the target elements is, with the rotor centered, greater in at least once oil reversal region than in a central region of the coil between two reversal regions, in which the coil runs tangentially, in particular the radial distance of the coil in the coil reversal region is at least twice as great as in the central region.

* * * * *